United States Patent Office 3,140,292
Patented July 7, 1964

3,140,292
PREPARATION OF METAL PHTHALOCYANINES
Peter Urban, Northbrook, Ill., assignor to Universal Oil Products Company, Des Plaines, Ill., a corporation of Delaware
No Drawing. Filed Apr. 7, 1961, Ser. No. 101,330
4 Claims. (Cl. 260—314.5)

This invention relates to a process for the preparation of metal phthalocyanines. More particularly, it relates to a novel process for the preparation of cobalt phthalocyanine.

Metal phthalocyanines originally achieved commercial importance as organic dyes and pigments. More recently it has been discovered that metal phthalocyanines embody certain desirable catalytic characteristics. For example, certain metal phthalocyanines are utilized in the petroleum industry to catalyze the oxidation of mercaptans in a petroleum distillate and thereby sweeten the so-called sour petroleum distillate.

Whether the metal phthalocyanine is to be utilized as a catalyst or as an organic dye and pigment, its utility is enhanced with its degree of purity. Conventional methods of preparation require burdensome procedures for the purification of the desired product, due in most cases to by-product formation.

It is an object of this invention to present a novel process for the preparation of a metal phthalocyanine.

It is a further object to present a novel process for the preparation of a metal phthalocyanine whereby the metal phthalocyanine is prepared in high yields in a substantially pure state.

It is a more specific object to present a novel process for the preparation of cobalt phthalocyanine.

In one of its broader aspects this invention embodies a process for the preparation of a metal phthalocyanine which comprises reacting a metal hydroxide and phthalonitrile in a solution comprising said metal hydroxide, an inert organic solvent, a solubilizing agent and said phthalonitrile at an elevated temperature ad recovering the desired metal phthalocyanine.

Another embodiment of this invention is in a process for the preparation of a metal phthalocyanine which comprises reacting a metal hydroxide and phthalonitrile in a solution comprising said metal hydroxide, an inert organic solvent, a solubilizing agent and said phthalonitrile at an elevated temperature, thereafter further reacting said phthalonitrile and said metal hydroxide in the presence of said inert organic solvent and said solubilizing agent and a catalyst and recovering the desired metal phthalocyanine.

A specific embodiment of this invention is in a process for the preparation of cobalt phthalocyanine which comprises adding phthalonitrile to a solution comprising cobalt hydroxide, trichlorobenzene, and quinoline, and reacting said phthalonitrile and said cobalt hydroxide at a temperature of from about 180° C. to about 220° C. and recovering the desired cobalt phthalocyanine.

Another specific embodiment of this invention is in a process for the preparation of cobalt phthalocyanine which comprises adding phthalonitrile to a solution comprising cobalt hydroxide, trichlorobenzene and quinoline and reacting said phthalonitrile and said cobalt hydroxide at a temperature of from about 180° C. to about 220° C., thereafter further reacting said cobalt hydroxide and said phthalonitrile in the presence of said trichlorobenzene and said quinoline and ammonium molybdate and recovering the desired cobalt phthalocyanine.

Other objects and embodiments of the process of this invention will become apparent in the following detailed specifications thereof.

In accordance with the process of this invention a metal hydroxide is reacted with phthalonitrile to yield the corresponding metal phthalocyanine. Any suitable metal hydroxide may be utilized although not necessarily with the same or equivalent results. Particularly preferred metal hydroxides include the iron group metal hydroxides, i.e., iron hydroxide, nickel hydroxide, and cobalt hydroxide. Other metal hydroxides which can be utilized include manganese hydroxide, copper hydroxide, magnesium hydroxide, zinc hydroxide, thorium hydroxide, lead hydroxide, bismuth hydroxide, chromium hydroxide, molybdenum hydroxide, platinum hydroxide, palladium hydroxide, etc. The metal hydroxides of this invention have been found to embody a number of advantages over the metal salts conventionally utilized for the preparation of metal phthalocyanines. For example, metal hydroxides can be utilized in a hydrated state while care must be taken to insure that the metal salts are in an anhydrous state. In addition, the utilization of the metal hydroxides in accordance with the process of this invention results in higher yields of a substantially pure product.

The metal hydroxide, which is preferably an iron group metal hydroxide is made into a solution utilizing an inert organic solvent which may be trichlorobenzene, o-dichlorobenzene, nitrobenzene, kerosene, naphthalene, chloronaphthalene, or other suitable inert organic solvent generally utilized in reactions of the type herein contemplated. Solution of the metal hydroxide in the particular inert organic solvent is aided by the addition of a solubilizing agent—generally a tertiary amine such as quinoline, pyridine, etc., or other suitable solubilizing agent known to the art. It is particularly preferred to utilize an excess of the solubilizing agent which will insure substantially complete solubility of the metal hydroxide throughout the course of the reaction. It has been observed that this procedure has a beneficial effect with respect to product yield.

Phthalonitrile is reacted with the selected metal hydroxide in a solution comprising said metal hydroxide, inert organic solvent, solubilizing agent, and said phthalonitrile at an elevated temperature of from about 150° C. to about 250° C. The metal hydroxides of this invention, and in particular the preferred iron group metal hydroxides, react rather vigorously with phthalonitrile and it is preferred to add the phthalonitrile to the aforesaid solution at a controlled rate which may be determined by the exothermic heat of reaction. It is further preferred to maintain the reaction temperature at from about 180° C. to about 220° C.

Substantial yields of the desired metal phthalocyanine can be prepared in accordance with the foregoing process as will hereinafter appear by reference to the appended examples. It has been found that by initially excluding a catalyst from the reaction mixture a purer grade of product is recovered. However, it has also been found that product purity can be retained and the yield further increased where a catalyst is subsequently employed. For example, the metal hydroxide and the phthalonitrile react exothermically in the presence of the aforesaid inert organic solvent and solubilizing agent, to give substantial yields of a substantially pure metal phthalocyanine. The reactants can thereafter be further reacted in the presence of said inert organic solvent and solubilizing agent by the addition of a catalyst thereto to increase the yield of the substantially pure product which is superior to that recovered when the reaction is initiated and completed in the presence of said catalyst.

Catalysts which can be utilized are such as are generally utilized to catalyze the reaction of metal salts and phthalonitrile to form metal phthalocyanines and include ammonium molybdate, cobalt chloride, and the like.

The reaction can be conducted in a sealed or an open vessel equipped with the necessary heating and heat recording means. A suitable vessel should include an overhead reflux condenser which may further include a water take-off leg. It is highly desirable in this type of operation that adequate means for agitation of the vessel contents, as well as a means for controlling the temperature thereof, be provided to secure optimum conversion and a minimum of by-product formation.

The metal phthalocyanine product can be recovered in a substantially pure state, say about 90% pure, by simple filtration techniques. Said product can be further purified by subliming off the impurities at an elevated temperature, which may be about 270° C., in an inert atmosphere such ash nitrogen or other suitable inert gas. The method of product recovery and purification made possible by the process of this invention is to be contrasted with the conventional method wherein the residue from the filtering process is first suspended in acetone heated and filtered, resuspended in dilute hydrochloric acid heated and filtered, and finally re-suspended in acetone and filtered to recover the desired metal phthalocyanine.

The process of this invention is illustrated by the following examples which are introduced solely for the purpose of illustration and with no intention of unduly limiting the generally broad scope of this invention thereto.

*Example I*

1000 grams of trichlorobenzene, 50 grams of quinoline, and 98 grams of cobalt hydrate [$Co(OH)_2$] were added to a three necked alkylating flask equipped with a mechanical stirrer, an overhead condenser, a dropping funnel, and a thermometer. The flask contents were brought to a temperature of about 210° C. and 512 grams of phthalonitrile were added thereto over a one hour period. The flask contents were maintained at a temperature of about 217° C. for about a 30 minute period following the phthalonitrile addition. The flask contents were then filtered hot. The residue cooled and suspended in three volumes of acetone. The suspension was brought to a boil and filtered while hot. The residue was then suspended in dilute hydrochloric acid. It was brought to a boil and filtered while hot. The residue was thereafter re-suspended in acetone and filtered to recover the cobalt phthalocyanine. 371 grams of cobalt phthalocyanine, a yield of 65% based on theoretical yield, was recovered. The purity of the product, as determined by spectral analysis, was 100%.

*Example II*

Approximately 1000 grams of trichlorobenzene, 50 grams of quinoline, and 98 grams of cobalt hydrate [$Co(OH)_2$] are heated at a temperature of about 210° C., and about 512 grams of phthalonitrile is added thereto over a 1 hour period. The reaction temperature is maintained at about 217° C. for a 30 minute period following the addition of the phthalonitrile. The reaction mixture is filtered hot and the residue recovered. The residue comprises substantially pure cobalt phthalocyanine. The purity of the cobalt phthalocyanine is increased to as much as 100% by heating to a temperature of about 270° C. in a stream of nitrogen and subliming off the remaining impurities.

*Example III*

1000 grams of trichlorobenzene, 50 grams of quinoline, and 98 grams of cobalt hydrate [$Co(OH)_2$] were added to the above described three necked alkylating flask. Flask contents were brought to a temperature of about 210° C. and 512 grams of phthalonitrile was added thereto over a one hour period. The flask contents were maintained at a temperature of about 217° C. for about a 30 minute period following the phthalonitrile addition. At the expiration of the 30 minute period about 5 grams of ammonium molybdate was added. The flask contents were heated at reflux temperature in the presence of the catalyst for a period of about 8 hours. The cobalt phthalocyanine was recovered in the manner described in Example I.

520 grams of cobalt phthalocyanine, a yield of 80% based on theoretical yield, was recovered. The purity of the product, as determined by spectral analysis, was 88%.

*Example IV*

Nickel phthalocyanine is prepared by adding about 1000 grams of trichlorobenzene, 50 grams of quinoline, and 93 grams of nickel hydroxide [$Ni(OH)_2$] to a vessel such as described in Example I. The vessel contents are brought to a temperature of about 210° C. and about 512 grams of phthalonitrile are added thereto over a period of about 1 hour. The vessel contents are maintained at a temperature of about 217° C. for an additional 30 minutes following the addition of the phthalonitrile. At this stage a considerable yield of substantially pure nickel phthalocyanine can be recovered.

The yield of nickel phthalocyanine is increased by the addition of about 5 grams of ammonium molybdate to the reaction mixture and continuing the reaction in the presence of said ammonium molybdate for about 8 hours at reflux temperatures.

*Example V*

Iron phthalocyanine is prepared by adding about 1000 grams of trichlorobenzene, 50 grams of quinoline, and 90 grams of iron hydroxide [$Fe(OH)_2$] to a vessel such as described in Example I. The vessel contents are brought to a temperature of about 210° C. and about 512 grams of phthalonitrile are added thereto over a period of about 1 hour. The vessel contents are maintained at a temperature of about 217° C. for an additional 30 minutes following the addition of the phthalonitrile. At this stage a considerable yield of substantially pure iron phthalocyanine can be recovered.

The yield of iron phthalocyanine is increased by the addition of about 5 grams of ammonium molybdate to the reaction mixture and continuing the reaction in the presence of said ammonium molybdate for about 8 hours at reflux temperatures.

I claim as my invention:

1. The process for the preparation of a metal phthalocyanine which comprises commingling a hydroxide of a metal selected from the group consisting or iron, nickel and cobalt with an inert organic solvent containing a sufficient amount of quinoline to dissolve said hydroxide in said solvent, heating the resultant solution to a temperature of from about 150° C. to about 250° C. and adding phthalonitrile thereto, reacting the phthalonitrile with the metal hydroxide in said solution and recovering the resultant metal phthalocyanine.

2. The process of claim 1 further characterized in that the metal of said hydroxide is cobalt.

3. The process of claim 1 further characterized in that said organic solvent is trichlorobenzene.

4. The process of claim 1 further characterized in that the metal of said hydroxide is cobalt and said organic solvent is trichlorobenzene.

References Cited in the file of this patent

UNITED STATES PATENTS

| 2,124,419 | Heilbron et al. | July 19, 1938 |
| 2,153,620 | Heilbron et al. | Apr. 11, 1939 |
| 2,214,477 | Riley | Sept. 10, 1940 |
| 2,276,598 | Stocker et al. | Mar. 17, 1942 |

FOREIGN PATENTS

| 538,957 | Great Britain | Aug. 22, 1941 |

OTHER REFERENCES

Parkes et al. (Ed): Mellor's Modern Inorg. Chem., Longman, Green and Co., New York, 1939, p. 826.

Sidgwich Chemical Elements and Their Compounds, Oxford Univ. Press, London, vol. 2, 1950, pp., 1328, 1377 and 1431.